United States Patent [19]
Holzer

[11] Patent Number: 5,173,340
[45] Date of Patent: * Dec. 22, 1992

[54] METHOD OF COATING A BASE OF A GOLD ALLOY OF AT LEAST 22 CARAT PURITY WITH A COATING WHICH IS ALSO OF AT LEAST 22 CARAT PURITY

[76] Inventor: Walter Holzer, Drosteweg 19, Meersburg, Fed. Rep. of Germany, 7758

[*] Notice: The portion of the term of this patent subsequent to Jan. 22, 2008 has been disclaimed.

[21] Appl. No.: 651,630

[22] Filed: Feb. 6, 1991

[51] Int. Cl.$^5$ .............................................. B05D 3/02
[52] U.S. Cl. .............................. 427/376.8; 427/383.7; 428/607; 428/672; 228/196; 228/263.18
[58] Field of Search .................... 427/376.8, 383.7; 228/263.18, 196; 428/672, 607

[56] References Cited

U.S. PATENT DOCUMENTS

| | | |
|---|---|---|
| 404,956 | 6/1889 | Burdon . |
| 440,693 | 11/1890 | Burdon . |
| 1,704,126 | 3/1929 | Fry . |
| 2,886,499 | 5/1959 | Schaer et al. .................. 204/41 |
| 3,165,825 | 1/1965 | Barney .......................... 29/411 |
| 3,356,982 | 12/1967 | Solow ........................... 338/308 |
| 3,494,579 | 2/1970 | Buchanan ..................... 245/10 |
| 3,606,766 | 9/1971 | Hill ................................ 428/672 |
| 3,955,934 | 5/1976 | Tizzi ............................. 29/191 |
| 4,297,416 | 10/1981 | Krug .............................. 428/576 |
| 4,987,038 | 1/1991 | Holzer .......................... 428/672 |

FOREIGN PATENT DOCUMENTS 2922104 4/1980 Fed. Rep. of Germany .
54-24692 8/1979 Japan .

OTHER PUBLICATIONS

Metals Handbook, 8th edition, vol. 1, 1961, pp. 1185–1186.

Primary Examiner—Shrive Beck
Assistant Examiner—Benjamin L. Utech
Attorney, Agent, or Firm—Brown, Martin, Haller & McClain

[57] ABSTRACT

A method of producing durable, structurally strong, investment quality gold articles of high troy weight, excellent color and revealing properties and the method of their production are described, including the formation of a structural base from an alloy containing not over 8.33% of a strengthening material such as chromium, titanium or vanadium, which can provide the required strength and hardness in low concentrations, and overlayment or "overarching" with a gold alloy coating in a manner such that both alloys are visible. The structural base provides the support, strength and resistance to corrosion in articles of various shapes, while retaining a high degree of gold purity.

4 Claims, 1 Drawing Sheet

METHOD OF COATING A BASE OF A GOLD ALLOY OF AT LEAST 22 CARAT PURITY WITH A COATING WHICH IS ALSO OF AT LEAST 22 CARAT PURITY

BACKGROUND OF THE INVENTION

1. Field of The Invention

This invention relates to the manufacture of hitherto nonexistent durable and beautiful investment quality gold articles and adornments of extremely high purity, yet capable of being worn and otherwise used.

2. Description of the Prior Art

Known and highly valued from the earliest times, gold is the most malleable and ductile metal. One ounce (28 g) can be pounded to provide 300 ft$^2$ (28 m$^2$) of gold leaf with which to adorn large pieces of artwork or architecture or drawn into 60 miles (97 km) of wire.

It is well known that gold has to be alloyed for strength. Steel and other metal objects can be gold plated, but as an investment, these objects are worthless. Gold alloys are used to produce wearable gold articles. Sometimes gold alloys are laminated to produce a beautiful piece of jewelry of a desired grade of purity on its outer shell, but containing a filler of much lower value.

Burdon, U.S. Pat. No. 440,693, describes a method of manufacturing seamless compound gold wire which can be molded into articles of jewelry and sold as gold of a specified value or karat purity. This value represents the average of the higher content gold shell and the lower content internal filler. Articles produced by Burdon's method still suffer from low purity and lack of uniformity when considering jewelry as an investment, averaging around 9 karat purity. Furthermore, the consumer is not readily able to ascertain the gold content of the entire piece, and abuses have been common.

Fry, U.S. Pat. No. 1,704,126, describes a process whereby a thin layer of platinum is laminated to a surface of gold alloy stock which comprises a softer inner gold-copper alloy layer, which is workable with jeweler's tools, and a gold-nickel outer layer, which possesses good color. To achieve a 14 karat purity average value for the gold stock, Fry uses a thick inner layer of 13.5 karat purity gold-copper alloy, and a thin layer of 20 karat purity gold-copper nickel. To obtain a 14 karat purity average value, Fry does little more than plate the core with the finer alloy, the ratio being approximately 21:1. While the outer coating prevents tarnishing and imparts a beautiful color, the concept still does not relate to producing quality gold jewelry.

What is needed is a method of producing gold articles which have the luxurious appearance and extreme fineness of nearly pure gold, and the strength to be wearable or otherwise useable. To be of investment quality, such articles must also be readily appraisable. If only it were possible to construct durable articles of nearly solid gold. The present disclosure presents a solution. Described herein is a method of manufacturing durable beautiful investment quality, wearable and otherwise useable gold articles with a hitherto unavailable troy weight of 22 karat purity or more.

SUMMARY OF THE INVENTION

This invention is a method of producing durable gold articles of investment quality, comprising the steps of producing a base of a first gold alloy of at least 22 karat purity, the alloy being composed of gold and a second element present in an amount sufficient, up to 8.33% of the alloy, to enhance the strength of the alloy; overlaying the base on all but one side with a coating composed of a second gold alloy of at least 22 karat purity; and bonding the base and the coating to form a uniform article, the relative proportions of the base and the coating being determinable by examining the uncoated part of the base.

In another aspect, the invention comprises a improvement in a method of producing durable articles from gold alloys, whereby investment quality articles of 22 karat purity or more are produced by the steps comprising producing a base of a first gold alloy of at least 22 karat purity, the alloy being composed of gold and a second element present in an amount sufficient, up to 8.33% of the alloy, to enhance the strength of the alloy; overlaying the base on all but one side with a coating composed of a second gold alloy of at least 22 karat purity; and bonding the base and the coating to form a uniform article, the base and coating being readily visible from the uncoated side.

This product of this invention is an article of structurally strong, investment quality gold articles of high troy weight, excellent color and revealing properties, comprising an investment quality gold alloy base of at least 22 karat purity, formed of gold alloyed with at least one additional element which is present in sufficient concentration to impart strength to the alloy but not to exceed 8.33% of this alloy; and a gold alloy coating also of at least 22 karat purity surrounding and affixed to all but one side of the base; the relative proportions of the base and the coating being readily determinable from observation of the uncoated portion of the base.

Thus, gold jewelry and other articles are produced where the structural base layer is not hidden but incorporated into an attractive and informative pattern, yielding something like a cross-sectional perspective. The coating alloy need not cover all sides readily visible without examination. For example, the structural base and the coating can be disposed relative to each other in a manner to take advantage of the beauty of the colors imparted by each of them.

Although chromium, titanium and vanadium were discovered nearly two hundred years ago or more, and have been used in alloys with other metals, to the Applicant's knowledge, they have not been alloyed with gold to produce articles described here. These elements have the specific properties of strength and hardness required in the structural base in such low concentrations.

DETAILED DESCRIPTION OF THE INVENTION

Figure 1:
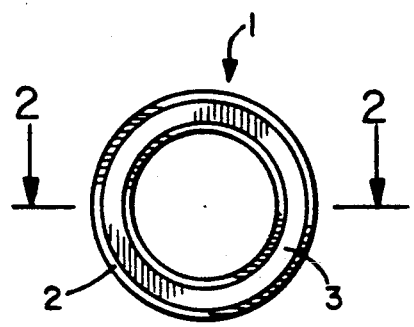
FIG. 1 is a schematic representation of a product formed by the method of this invention, namely a ring, formed of the bonded gold alloys.
Figure 2:
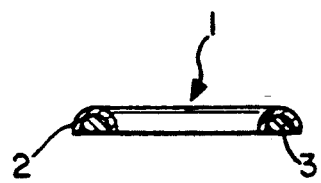
FIG. 2 is a sectional view taken along line II—II of FIG. 1.

The method of this invention is best understood by reference to the description of the articles produced, particularly illustrated in the drawings. FIGS. 1 and 2 schematically illustrate the concept of this invention. FIG. 1 depicts the outside surface of a ring, displaying a uniform, fine structured gold alloy. FIG. 2, however, shows that the ring is not of a uniform character, but is in fact composed of a core or base 3 and an overlying abutting non-continuous coating layer 2. The core or base, which serves as a structural support member, comprises an alloy having at least two elemental components, one component of which is a hard metal added for the specific purpose of strengthening the entire structure. The other component is pure 24 karat purity gold.

It is critical to this invention that the coating layer coats or clads more than half, and preferably most surfaces of all sides except the back, of the jewelry article, so that the coating "arches over" and is fully supported by the base layer. The idea here is not to use the core as a filler with an inferior gold alloy, as is practiced in the prior art, but to use a strengthener which is effective in small amounts in order to maintain a high quality 22+ karat purity structure through-out the article while yet providing a high strength alloy base to support the outer coating layer. In order to retain the near-pure gold composition, the strengthener must be present and effective in concentrations of or below 8.33%. If the alloy is other than binary, the concentration of strengthener must be adjusted to compensate.

The unclad surface of the jewelry article need not always be hidden from view or on the underside. In an alternate embodiment, if the two alloys are of different colors, this structural aspect can be exploited to produce jewelry in variant attractive color patterns, keeping in mind the purpose of the unclad side so as not to distort consumer perception.

The use of pure gold as an overwhelmingly major component of an alloy teaches away from having to choose inferior metals for their workability properties resulting in low quality jewelry. Being the most malleable and ductile metal, gold can tame the hardness and brittleness of the added strengthener, and does not have to be replaced by copper or some other previously used metal for these workability properties.

Figure 3:
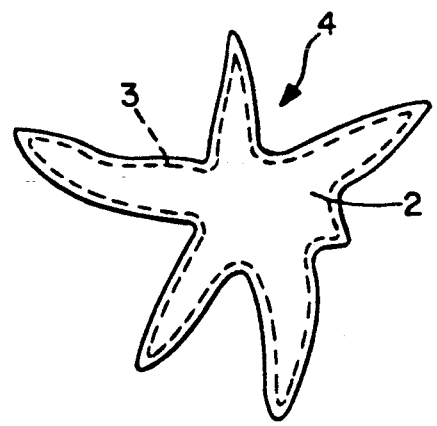
FIG. 3 is a top plan view of an article formed by the method of this invention, namely a brooch.

FIG. 3 is a top plan view of a gold brooch 4 constructed in the manner defined by this invention. The uniform outer coating 2 covers an underlying supporting structural base 3. As stated above, it is envisioned that in another embodiment the layers could be combined in a manner where the base structural layer is not covered by the coating layer, but where the two layers are exposed, for example, in a banded arrangement, if the effect were aesthetically pleasing. In other words, the supporting structural base could be revealed by positioning it to be visible, e.g. topmost, while retaining its supportive function In all cases the thickness of the overlying coating preferably is uniform.

The two layers constituting the gold jewelry can be joined or bonded in any conventional manner known and practiced by those skilled in the art, including "sweating" or welding, cementing or merely sheathing if appropriate.

It will be appreciated that, regardless of the proportions of the two alloys, the overall value or karat purity rating is 22 karat fineness or more, since both alloys are high quality, 22 karat purity or better, and the rating for the jewelry article is not attained by averaging a low rated filler and a high rated thin shell as commonly found in the prior art.

I claim:

1. A method of producing a durable gold article of investment quality, comprising the steps of:
   a. producing a base of a first gold alloy of at least 22 karat purity, said alloy being composed of gold and a second element present in an amount sufficient, up to 8.33% of said alloy, to enhance the strength of said alloy;
   b. overlaying said base on all but one side with a coating composed of a second gold alloy of at least 22 karat purity, said uncoated side remaining visible; and
   c. bonding said base and said coating by welding, cementing or sheathing to form a uniform article, the relative proportions of said base and said coating being determinable by examining said uncoated side of said base.

2. A method as described in claim 1 wherein said strengthening element is selected from the group consisting of chromium, vanadium and titanium.

3. A method as described in claim 1 wherein said gold alloy coating contains an element imparting a desired color to said coating.

4. A method as described in claim 1 wherein said strengthened gold alloy possesses a color different from said color of said coating gold alloy.

* * * * *